(12) United States Patent
Lee et al.

(10) Patent No.: US 8,400,964 B2
(45) Date of Patent: Mar. 19, 2013

(54) COMMUNICATING DATA BLOCK IN WIRELESS COMMUNICATION SYSTEM

(75) Inventors: Young-Dae Lee, HaNam-Shi (KR); Sung-Duck Chun, Anyang (KR); Patrick Fischer, Bourg la Reine (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/690,058

(22) Filed: Jan. 19, 2010

(65) Prior Publication Data

US 2010/0118820 A1    May 13, 2010

Related U.S. Application Data

(63) Continuation of application No. 11/317,933, filed on Dec. 23, 2005, now Pat. No. 7,672,261.

(30) Foreign Application Priority Data

Jan. 3, 2005    (KR) .......................... 10-2005-000201

(51) Int. Cl.
*H04W 4/00* (2009.01)
(52) U.S. Cl. ........................................ 370/328; 370/329
(58) Field of Classification Search .................. 370/328, 370/329
See application file for complete search history.

(56) References Cited

U.S. PATENT DOCUMENTS

| | | | |
|---|---|---|---|
| 5,809,059 A | 9/1998 | Souissi et al. | |
| 6,781,970 B1 * | 8/2004 | Ovesjo et al. | 370/328 |
| 6,839,565 B2 | 1/2005 | Sarkkinen et al. | |
| 6,996,410 B2 | 2/2006 | Bos et al. | |
| 7,079,854 B2 | 7/2006 | Lee et al. | |
| 7,162,241 B2 | 1/2007 | Kim et al. | |
| 7,177,658 B2 | 2/2007 | Willenegger et al. | |
| 7,200,135 B2 * | 4/2007 | Choi et al. | 370/348 |
| 7,203,512 B2 | 4/2007 | Jeong et al. | |
| 7,215,655 B2 * | 5/2007 | Zhang et al. | 370/320 |
| 7,242,960 B2 | 7/2007 | van Rooyen | |
| 7,283,815 B2 | 10/2007 | Kim et al. | |
| 7,301,927 B2 | 11/2007 | Lee et al. | |
| 7,318,187 B2 | 1/2008 | Vayanos et al. | |
| 7,346,339 B2 | 3/2008 | Lee et al. | |
| 7,349,711 B2 | 3/2008 | Hu et al. | |
| 7,373,148 B2 | 5/2008 | Kim et al. | |
| 7,394,778 B2 | 7/2008 | Kim | |

(Continued)

FOREIGN PATENT DOCUMENTS

| | | |
|---|---|---|
| CN | 1358020 | 7/2002 |
| CN | 1418443 | 5/2003 |
| CN | 1479986 | 3/2004 |

(Continued)

OTHER PUBLICATIONS

Valkealahti, K. et al., "UMTS Radio Network Multiparameter Control," the 14th IEEE Proceedings on Personal, Indoor and Mobile Radio Communications, vol. 1, Sep. 2003, pp. 616-621.

*Primary Examiner* — Farah Faroul
(74) *Attorney, Agent, or Firm* — Lee, Hong, Degerman, Kang & Waimey

(57) ABSTRACT

A method of transmitting/receiving a data block is disclosed. In receiving at least one data block multiplexed to one physical channel, the present invention includes the steps of receiving control information for a data block transmission, checking whether there is a necessity for configuring a table having combination information of data block sizes internally, and configuring the table having the combination information of the data block sizes for a data block reception according to a result of the checking step. Accordingly, the present invention internally configures the Calculated Transport Format Combination (CTFC) information without receiving separate CTFC information, thereby facilitating the reception of data blocks.

18 Claims, 5 Drawing Sheets

U.S. PATENT DOCUMENTS

| | | |
|---|---|---|
| 7,443,813 B2 | 10/2008 | Hwang et al. |
| 7,450,547 B2 | 11/2008 | Kim et al. |
| 7,586,874 B2 | 9/2009 | Rudolf et al. |
| 7,590,089 B2 * | 9/2009 | Park et al. ............... 370/329 |
| 8,073,456 B2 * | 12/2011 | Tidestav ............... 455/453 |
| 2002/0114294 A1 | 8/2002 | Toskala et al. |
| 2002/0160744 A1 | 10/2002 | Choi et al. |
| 2002/0160785 A1 | 10/2002 | Ovesjo et al. |
| 2004/0087340 A1 | 5/2004 | Cao et al. |
| 2004/0117860 A1 * | 6/2004 | Yi et al. ............... 725/147 |
| 2004/0233899 A1 * | 11/2004 | Vayanos et al. ............ 370/352 |
| 2005/0128973 A1 * | 6/2005 | Yagihashi ............... 370/328 |
| 2005/0135400 A1 * | 6/2005 | Abe et al. ............... 370/431 |
| 2005/0185594 A1 * | 8/2005 | Horneman et al. ............ 370/252 |
| 2005/0207372 A1 | 9/2005 | Beckmann et al. |
| 2005/0213536 A1 * | 9/2005 | Virtanen et al. ............ 370/329 |
| 2006/0031563 A1 | 2/2006 | Sebire et al. |
| 2007/0127369 A1 * | 6/2007 | Sebire ............... 370/229 |

FOREIGN PATENT DOCUMENTS

| | | |
|---|---|---|
| EP | 1006692 | 6/2000 |
| EP | 1191750 | 3/2002 |
| EP | 1418780 | 5/2004 |
| GB | 2401760 | 11/2004 |
| RU | 2257674 | 7/2005 |
| WO | 99/14951 | 3/1999 |
| WO | 00/28760 | 5/2000 |
| WO | 01/17283 | 3/2001 |
| WO | 2004-004392 | 1/2004 |

\* cited by examiner

COMMUNICATING DATA BLOCK IN WIRELESS COMMUNICATION SYSTEM

CROSS REFERENCE TO RELATED APPLICATION

This application is a continuation of U.S. application Ser. No. 11/317,933, filed on Dec. 23, 2005, now U.S. Pat. No. 7,672,261, which claims benefit of earlier filing date and right of priority to Korean Patent Application No. 2005-000201, filed on Jan. 3, 2005, the contents of which are hereby incorporated by reference herein in their entirety.

FIELD OF THE INVENTION

The present invention relates to a wireless communication system, and particularly, to configuring the combination information of the data block and transmitting/receiving the data block using the combination information.

BACKGROUND OF THE INVENTION

FIG. 1 is a block diagram of a network structure of a UMTS (universal mobile telecommunications system). Referring to FIG. 1, a UMTS comprises a user equipment (UE), a UMTS terrestrial radio access network (UTRAN), and a core network (CN). The UE is also known as mobile terminal or subscriber unit.

The UTRAN includes at least one radio network sub-system (RNS). And, the RNS includes one radio network controller (RNC) and at least one base station (Node B) managed by the RNC. And, at least one or more cells exist in one Node B.

FIG. 2 is an architectural diagram of a radio interface protocol between one UE and UTRAN. Referring to FIG. 2, a radio interface protocol vertically includes a physical layer, a data link layer, and a network layer and horizontally includes a user plane for data transfer and a control plane for signaling.

The protocol layers in FIG. 2 comprises a L1 (first layer), a L2 (second layer), and a L3 (third layer) referring to three lower layers of the open system interconnection (OSI) standard model widely known in the communications systems.

The respective layers in FIG. 2 are explained as follows. The physical layer (PHY) as the first layer offers an information transfer service to an upper layer using a physical channel. The physical layer PHY is connected to a medium access control (MAC) layer above the physical layer PHY. The data are transferred between the medium access control layer MAC and the physical layer PHY via the transport channel. Moreover, the data are transferred between one physical layer of a transmitting side and the other physical layer of a receiving side via the physical channel.

The MAC layer of the second layer transfer information to a radio link control layer above the MAC layer via a logical channel. The radio link control (RLC) layer of the second layer supports reliable data transfer and is operative in segmentation and concatenation of RLC service data units received from an upper layer. Hereinafter, the service data unit will be abbreviated SDU.

A radio resource control (RRC) layer located on a lowest part of the third layer is defined in the control plane only and is associated with configuration, reconfiguration and release of radio bearers (RB) to be in charge of controlling the logical, transport and physical channels. In this case, the RB means a service offered by the second layer for the data transfer between the UE and the UTRAN. In general, the configuring of RB means defining characteristics of protocol layers and channels necessary for offering a specific service and setting their specific parameters and operational methods, respectively.

A multimedia broadcast/multicast service (MBMS) offers a streaming or background service to a plurality of UEs using a downlink MBMS bearer service. One MBMS includes at least one session, and MBMS data are transmitted to a plurality of the UEs via the MBMS bearer service during an ongoing session.

A UTRAN offers the MBMS bearer service to UEs using radio bearers. As a type of the RB used by the UTRAN, there are a point-to-point radio bearer and a point-to-multipoint radio bearer. In this case, the point-to-point radio bearer is a bi-directional radio bearer and includes a logical channel DTCH (dedicated traffic channel), a transport channel DCH (dedicated channel) and a physical channel DPCH (dedicated physical channel) or a physical channel SCCPCH (secondary common control physical channel). The point-to-multipoint radio bearer is a uni-directional downlink radio bearer.

FIG. 3 is a diagram for explaining channel mapping for MBMS. Referring to FIG. 3, a point-to-multipoint radio bearer includes a logical channel MTCH (MBMS traffic channel), a transport channel FACH (forward access channel) and a physical channel SCPCH. The logical channel MTCH is configured for each MBMS offered by one cell and is used in transmitting user-plane data of a MBMS to a plurality of UEs.

A logical channel MCCH (MBMS control channel), as shown in FIG. 3, is a point-to-multipoint downlink channel and is used in transmitting control information associated with the MBMS. The logical channel MCCH is mapped to the transport channel FACH (forward access channel), while the transport channel FACH is mapped to the physical channel SCCPCH (secondary common control physical channel). One cell has one MCCH.

The UTRAN offering the MBMS transmits MCCH information to a plurality of UEs via the MCCH channel. The MCCH information includes a notification message associated with the MBMS, i.e., an RRC message associated with the MBMS. For instance, the MCCH information includes a message that notifies MBMS information, a message that notifies point-to-multipoint radio bearer information, access information notifying that an RRC connection is requested for a specific MBMS.

SUMMARY OF THE INVENTION

Accordingly, the present invention is directed to a method of transmitting/receiving a data block that substantially obviates one or more problems due to limitations and disadvantages of the related art.

An object of the present invention is to provide a method of transmitting/receiving a data block, in which combination information having a data block size is internally configured and by which the data block can be efficiently transmitted/received using the internally configured combination information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving data blocks through a plurality of higher level channels mapped to a lower level channel in a wireless communication system comprises receiving a message comprising a data block size combination set parameter from a network; defining a default set of data block size combinations if there is no data block size combination set parameter in the message, and receiving the lower level channel using one of the block size combinations. Preferably, each one of the data block size combinations is associated with only one of the plurality of higher level channels carrying a data block. The method further comprises defining a second set of data block size combinations if there is the data block size combination set parameter in the message. The plurality of higher level channels are primarily used for data traffic transmission. Also, the plurality of higher level channels comprises transport channels, and the lower level channel comprises a physical channel. The data blocks provided through a plurality of higher level channels comprise point-to-multipoint service data.

According to one aspect of the invention, the method further comprises receiving data block size information for each of the plurality of higher level channels, and receiving a number of the plurality of higher level channels from the network that defines the set of data block size combinations. Preferably, the set of data block size combinations is defined by using the data block size information. The set of data block size combinations is further defined by using the number of the plurality of higher level channels.

According to another aspect of the invention, the data block comprises a transport block, the data block size combination comprises a transport format combination, and the set of block size combinations comprises a transport format combination set.

According to another aspect of the invention, the step of receiving the lower level channel using one of the block size combinations further comprises receiving a data block size combination indicator from the network. Preferably, the lower level channel is decoded by using one of the data block size combinations according to the data block size combination indicator.

According to another embodiment of the invention, a method of communicating point-to-multipoint service control information for a wireless communication system comprises defining a default set of data block size combinations for use in a user equipment for a point-to-multipoint service, wherein each one of the default set of data block size combinations is associated with a transport format of each transport channel; providing the default set of data block size combinations to the user equipment; and transmitting a data block size combination indicator from a network to the user equipment to allow the user equipment to receive point-to-multipoint service control information, wherein the transport format of the point-to-multipoint service control information is determined by associating, preferably directly, the received data block size combination indicator with the default set of data block size combinations.

According to yet another embodiment of the invention, a mobile terminal for receiving data blocks through a plurality of higher level channels mapped to a lower level channel in a wireless communication system comprises an antenna for receiving a radio signal; a radio frequency unit connected to the antenna and configured to process the radio signal from the antenna; a processor unit operationally connected to the radio frequency unit and being configured to receive a message comprising a data block size combination set parameter from a network and defining a default set of data block size combinations if there is no data block size combination set parameter in the message, and receiving the lower level channel using one of the block size combinations.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
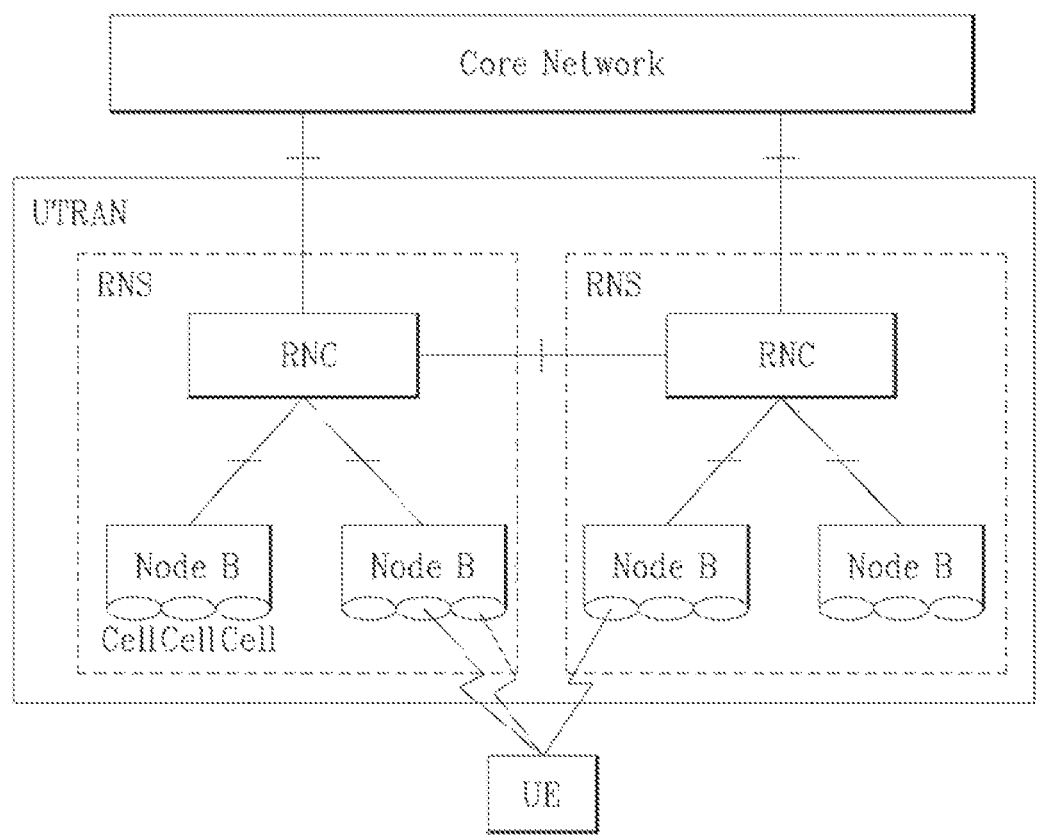
FIG. 1 is a block diagram of a network structure of a general UMTS.
Figure 2:
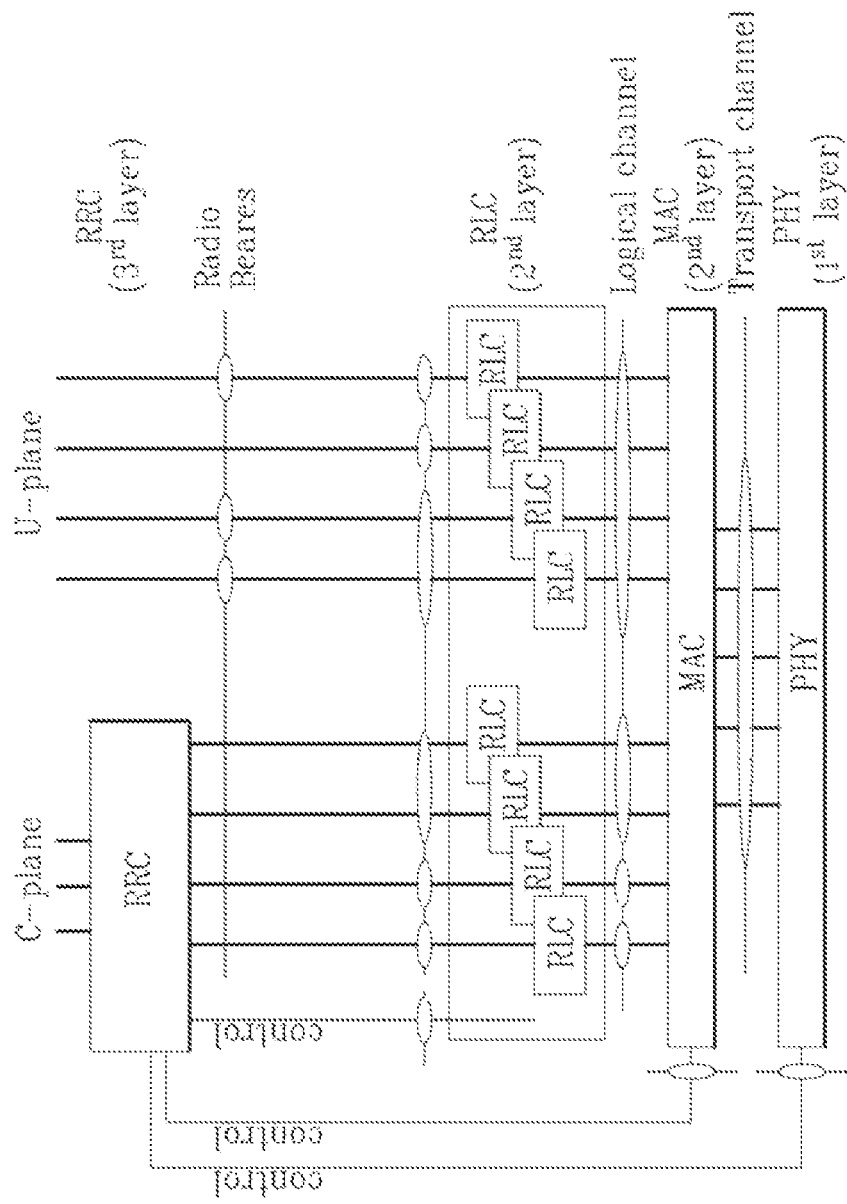
FIG. 2 is a diagram of a structure of a radio interface protocol between UE and UTRAN according to a related art.
Figure 3:
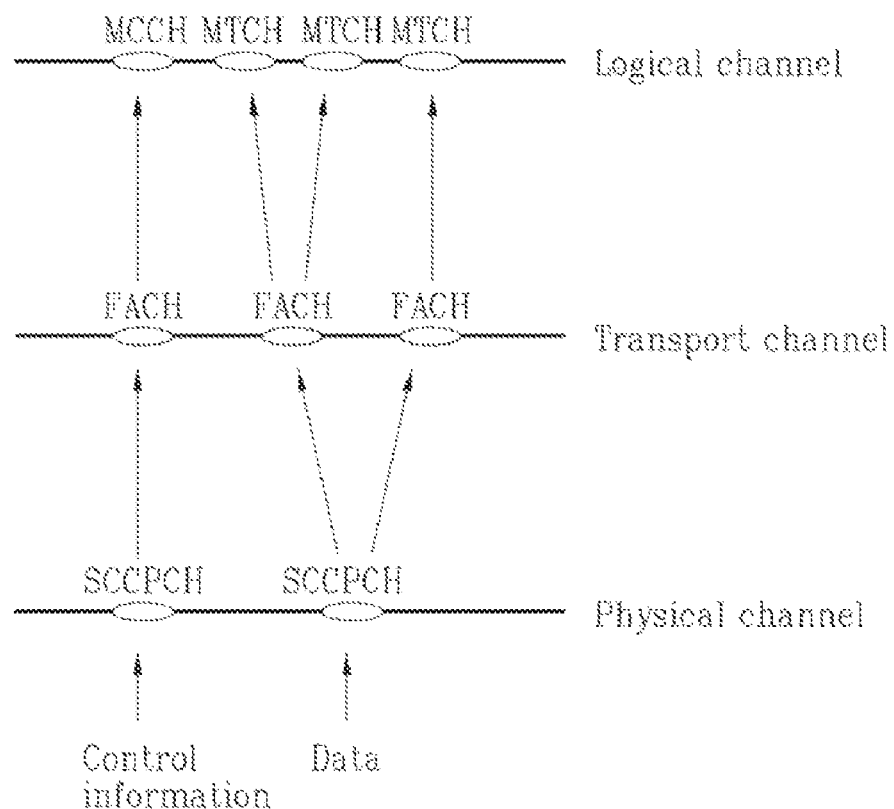
FIG. 3 is a diagram for explaining channel mapping for MBMS according to a related art.
Figure 4:
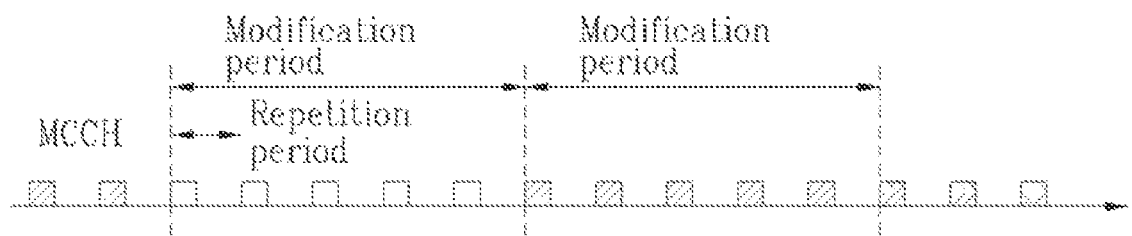
FIG. 4 is a diagram for explaining a transmission method of MCCH information.

FIG. 4 is a diagram for explaining a transmission method of MCCH information. Referring to FIG. 4, the MCCH information is periodically transmitted according to a modification period and a repetition period. The MCCH information includes critical information and non-critical information. The non-critical information may be modified per a modification period or a repetition period. The modification of the critical information is preferably made per modification period only. The critical information is transmitted per repetition period. The modified critical information is preferably transmitted at a start point of the modification period.

In the case that at least two neighbor cells transmit the same MBMS information via an MTCH, a UE receives the MTCH transmitted from these cells and performs soft combining the received MTCH to obtain diversity gain. In this case, the transport blocks from the cells in the same time interval should be identical to each other. And, to facilitate the UE to perform the soft combining, a UTRAN transmits transport blocks for one transport channel only for one transmission time interval (TTI).

According to an exemplary embodiment one transport block is transmitted via one transport channel for one TTI. If there exists transport blocks to be transmitted, a transmitting side MAC transmits at least one or more transport blocks to a physical layer during a TTI unit. A transmitting side physical layer encodes the at least one or more transport blocks received from the MAC, and transmits the encoded transport block to a receiving side physical layer.

To help the receiving side physical layer to decode the encoded data correctly, the transmitting side transmits transport format (TF) information to the receiving side together with the encoded data. After having received the TF information transmitted from the transmitting side, the receiving side physical layer decodes the received data using the TF to reconfigure the transport blocks. The reconfigured transport blocks are transmitted to a receiving side MAC during a TTI unit.

The TF information includes various attributes regarding one transport channel. Attributes of the TF information can be classified into attributes of the semi-static part and attributes of the dynamic part. The semi-static attribute means the TF information that can be changed slowly according to an RRC message. And, the dynamic attribute means the TF information that can be quickly changed based on TTI or radio frame unit. In this case, the dynamic attribute is transmitted via a transport format combination indicator (TFCI). The transmitting side transmits the TFCI to the receiving side via a control field of a physical channel.

As exemplary dynamic attributes of the TF information, there are a transport block size and a transport block set size. The transport block size is defined as a set of transport blocks in a TTI. One transport block is defined as one MAC PDU (protocol data unit) including one MAC SDU (service data unit) and one MAC header. At least one or more transport blocks can be transmitted within one TTI. In this case, sizes of the transport blocks transmitted within same TTI are equal to each other. Hence, a size of the transport block set is multiple to the size of the transport block.

An RRC establishes a set of size values of transport blocks which are able to be transmitted via a transport channel. A set of the transport blocks corresponding to one transport channel is called a transport format set (TFS). At least two transport channels are preferably mapped to a physical channel, the RRC establishes a set of combinations of the transport blocks of the transport channels that can be simultaneously transmitted for a time interval via the corresponding physical channel. A set of the combinations (transport format combinations) of the transport blocks transmitted via at least two transport channels mapped to one physical channel is called a TFCS (transport format combination set). An RNC transmits TFCS information of the physical channel to the transmitting and receiving sides. The RNC transforms the TFCS information into calculated transport format combination (CTFC) information and transmits to the transmitting and receiving sides instead of directly transmitting the TFCS information.

Table 1 shows an example of TFS configured for each transport channel in case that three transport channels are mapped to one physical channel.

TABLE 1

|  |  | Transport channel | | |
|---|---|---|---|---|
|  |  | $1^{st}$ transport channel | $2^{nd}$ transport channel | $3^{rd}$ transport channel |
|  |  | Possible transport block size | | |
|  |  | 0, 39, 81 | 0, 52, 103 | 60 |
| TFS | TF0, bits | 1x0 | 0x52 | 0x60 |
|  | TF1, bits | 1x39 | 1x52 | 1x60 |
|  | TF2, bits | 1x81 | 1x103 | — |

In Table 1, a size of a transport block possible on a first transport channel is 0 bit, 39 bits or 81 bits. A size of a transport block possible on a second transport channel is 0 bit, 52 bits or 103 bits. And, a size of a transport block possible on a third transport channel is 60 bits. In this case, a possible TFS is represented by 'N×S' in Table 1. 'N' is a number of data blocks transmitted in one TTI and 'S' indicates a bit size of the transmitted data block.

In the example of Table 1, the TFS of the $1^{st}$ transport channel includes three TFs (TF0, TF1, TF2), the TFS of the $2^{nd}$ transport channel includes three TFs, and the TFS of the $3^{rd}$ transport channel includes two TFs. Hence, the TFCS can include maximum eighteen (3×3×2=18) combinations. In general, the number of the combinations included in the TFCS is smaller than the maximum number of combinations. In the example of Table 1, the TFCS includes eight combinations, i.e., eight TFCs. Hence, the rest of the combinations are not used.

Table 2 shows an example of TFCS in three transport channels.

TABLE 2

TFCS (transport channel#1, transport channel#2, transport channel#3) = (TF0, TF0, TF0), (TF0, TF1, TF0), (TF0, TF2, TF0), (TF0, TF0, TF1), (TF0, TF1, TF1), (TF0, TF2, TF1), (TF1, TF0, TF0), (TF2, TF0, TF0)

Table 3 shows mapping relations between TFCS, CTFC and TFCI.

TABLE 3

| TFC ($1^{st}$ transport channel, $2^{nd}$ transport channel, $3^{rd}$ transport channel) | CTFC ($1^{st}$ transport channel, $2^{nd}$ transport channel, $3^{rd}$ transport channel) | TFCI |
|---|---|---|
| (TF0, TF0, TF0) | 0 | 0 |
| (TF0, TF1, TF0) | 3 | 1 |
| (TF0, TF2, TF0) | 6 | 2 |
| (TF0, TF0, TF1) | 9 | 3 |
| (TF0, TF1, TF1) | 12 | 4 |
| (TF0, TF2, TF1) | 15 | 5 |
| (TF1, TF0, TF0) | 1 | 6 |
| (TF2, TF0, TF0) | 2 | 7 |

In Table 3, a TFC is transformed into a value called a CTFC according to a predetermined formula so that the CTFC value is mapped to a specific TFC. Hence, a receiving side receives CTFC information to restore a TFC value. The transformed CTFC information is a sequence of CTFC values. In the example of Table 3, the sequence of {0, 3, 6, 9, 12, 15, 1, 2} corresponds to the CTFC information. In the UE, as shown in Table 3, the TFCI values are mapped to the CTFC according to the sequence of {0, 3, 6, 9, 12, 15, 1, 2}.

A transmitting side, as shown in Table 3, recognizes the mapping rule between the TFCS and the TFCI, and transmits the TFCI corresponding to TFC together when the data is transmitted in the TTI unit. The receiving side determines TFC corresponding to the received TFCI from the TFCS, using the CTFC information and then receives the data transmitted together corresponding to the TFC.

The transmitting and receiving sides find the mapping rule between the TFCS information and the TFCI from the CTFC information. Hence, the transmitting and receiving sides need to know the mapping rule between the TFCS information and the TFCI based on the received CTFC information. However, if the mapping rule is determined without the CTFC information, transmission/reception of the CTFC is not needed. For instance, in case of the soft combining of MBMS, transport blocks corresponding to one transport channel are transmitted during one TTI. Hence, the receiving side is facilitated to know the mapping rule between the TFCS information and the TFCI, without the CTFC information.

If the transmitting or receiving side recognizes the mapping rule through the CTFC information received from an external device, the information amount of an RRC message for informing the CTFC information is increased. If the CTFC information, is not received, data cannot be received since the mapping relation between the TFCS information and the TFCI is unknown.

Therefore, if a UE internally configures the CTFC information from the TFS information and applies the configured CTFC information, it is able to receive data blocks of the multicast/broadcast service more efficiently.

In a method of receiving data blocks according to the present invention, the UE receives the data blocks using a combination number of at least one data block size and combination information of the data block size corresponding to the combination number. In particular, the UE receives data block size information for each channel multiplexed to a downlink physical channel, and internally configures combination information of the data block size from the data block size information. Once receiving the combination number and the data block, the UE finds combinations corresponding to the received combination numbers using the configured combination information, and restores data blocks from the multiplexed channels.

The internally configured combination information includes a combination corresponding to a case that the entire multiplexed channels do not transmit the data blocks, and a combination corresponding to a case that one of the multiplexed channels transmits the data block. In this case, the combination information can be configured in a manner that the combination information includes all data block sizes being able to be transmitted in a transmission interval via each channel.

The data block is a transport block of a transport channel and the data block size is a size of the transport block. A combination number of the data block size is TFCI and the combination information of the data block size is TFCS. And, the data block is a data block of a multicast or broadcast service. The data block is preferably transmitted via a logical channel MTCH, a transport channel FACH and a physical channel SCCPCH. At least two cells simultaneously transmit the same data block via different physical channels respectively, and a UE receives the data block by combining the physical channels via which same service is offered.

The combination information internally configured by the UE is a default TFCS. The default TFCS includes following combinations of transport block sizes, i.e., TFCs for transport channels mapped to one physical channel.

1. All in TFC do not transmit transport blocks.

2. One of a1, a2, . . . , aN transmits transport block but the rest do not transmit transport block.

In this case, TFC includes (a1, a2, . . . , aN), wherein 'al' indicates a TF for an $I^{th}$ transport channel, i.e., a transport block size and a transport block set size(??). 'N' is the number of transport channels mapped to one physical channel.

The default TFC configures a TFC for each TF that each of the transport channels can transmit.

TABLE 4

| TFC<br>($1^{st}$ transport channel,<br>$2^{nd}$ transport<br>channel, $n^{th}$ transport channel) | CTFC<br>($1^{st}$ transport channel, $2^{nd}$ transport<br>channel, $n^{th}$ transport channel) | TFCI |
|---|---|---|
| (TF0, TF0, . . . , TF0) | CTFC (TF0, TF0, . . . , TF0) | 0 |
| (TF1, TF0, . . . , TF0) | CTFC (TF1, TF0, . . . , TF0) | 1 |
| (TF2, TF0, . . . , TF0) | CTFC (TF2, TF0, . . . , TF0) | 2 |
| . . . | . . . | . . . |
| (TFmax, TF0, . . . , TF0) | CTFC (TFmax, TF0, . . . , TF0) | |
| (TF0, TF1, . . . , TF0) | CTFC (TF0, TF1, . . . , TF0) | |
| (TF0, TF2, . . . , TF0) | CTFC (TF0, TF2, . . . , TF0) | |
| . . . | . . . | |
| (TF0, TFmax, . . . , TF0) | CTFC (TF0, TFmax, . . . , TF0) | |
| . . . | . . . | |
| (TF0, TF0, . . . , TF1) | CTFC (TF0, TF0, . . . , TF1) | |
| (TF0, TF0, . . . , TF2) | CTFC (TF0, TF0, . . . , TF2) | |
| . . . | . . . | |
| (TF0, TF0, . . . , TFmax) | CTFC (TF0, TF0, . . . , TFmax) | |

Table 4 shows an example of a configuration format of a default TFCS. If CTFC information is not received from an RNC, a transmitting or receiving side replaces the CTFC information by the default TFCS. In case of a downlink transmission, the transmitting side is a Node B and the receiving side is a UE. In case of an uplink transmission, the transmitting side is a UE and the receiving side is a Node B. And, an MBMS data transmission corresponds to the downlink transmission.

A meaning of (TFi, TFj, . . . , TFk) in Table 4 is explained as follows. TFi is a transport format of a first transport channel, TFj is a transport format of a second transport channel, and TFk is a transport format of a last transport channel. These transport channels are mapped to the same physical channel. If the number of the transport channels mapped to the same physical channel is n, the number of TF items within a parenthesis '( )' becomes n.

In Table 4, TF0 denotes a transport format corresponding to a 0-bit transport block size and TFmax denotes a transport format corresponding to a biggest transport block size in the corresponding transport channel. The transmitting or receiving side configures the default TFCS through the number (n) of transport channels mapped to a physical channel informed by the RNC and the TFS information (TF0, TF1, . . . , Tfmax) for each transport channel.

Preferably, if the RNC does not inform the CTFC information of the physical channel, the transmitting or receiving side configures the default TFCS. A first TFC of the default TFC includes a combination of TF0 for each transport channel. The combination is configured in a manner that a second TFC is TF1 for a first transport channel and that TF0 is for each of the rest of the transport channels.

The transmitting or receiving side configures TFCs in a manner that the rest of the transport channels correspond to TF0 until corresponding TF of first transport channel reaches Tfmax. And, the transmitting or receiving side configures TFCs in a manner that the rest of the transport channels correspond to TF0 until corresponding TF of the second transport channel reaches TFmax from TF1. And, the transmitting or receiving side configures TFCs until corresponding TF of the last transport channel reaches TFmax from TF1.

The transmitting or receiving side arranges TFCs according to a rule shown in Table 4 and maps TFCI values according to the arrangement sequence in order. According to the above configured default TFCS, the transmitting side selects the TFCI value suitable for the TFC of data to be transmitted, and transmits the selected TFCI to the receiving side. The receiving side selects the TFC suitable for the received TFCI from the default TFCS and receives data using the selected TFC. The MBMS default TFCS is mainly employed in case of receiving MBMS data from at least two cells by soft combining.

Figure 5:
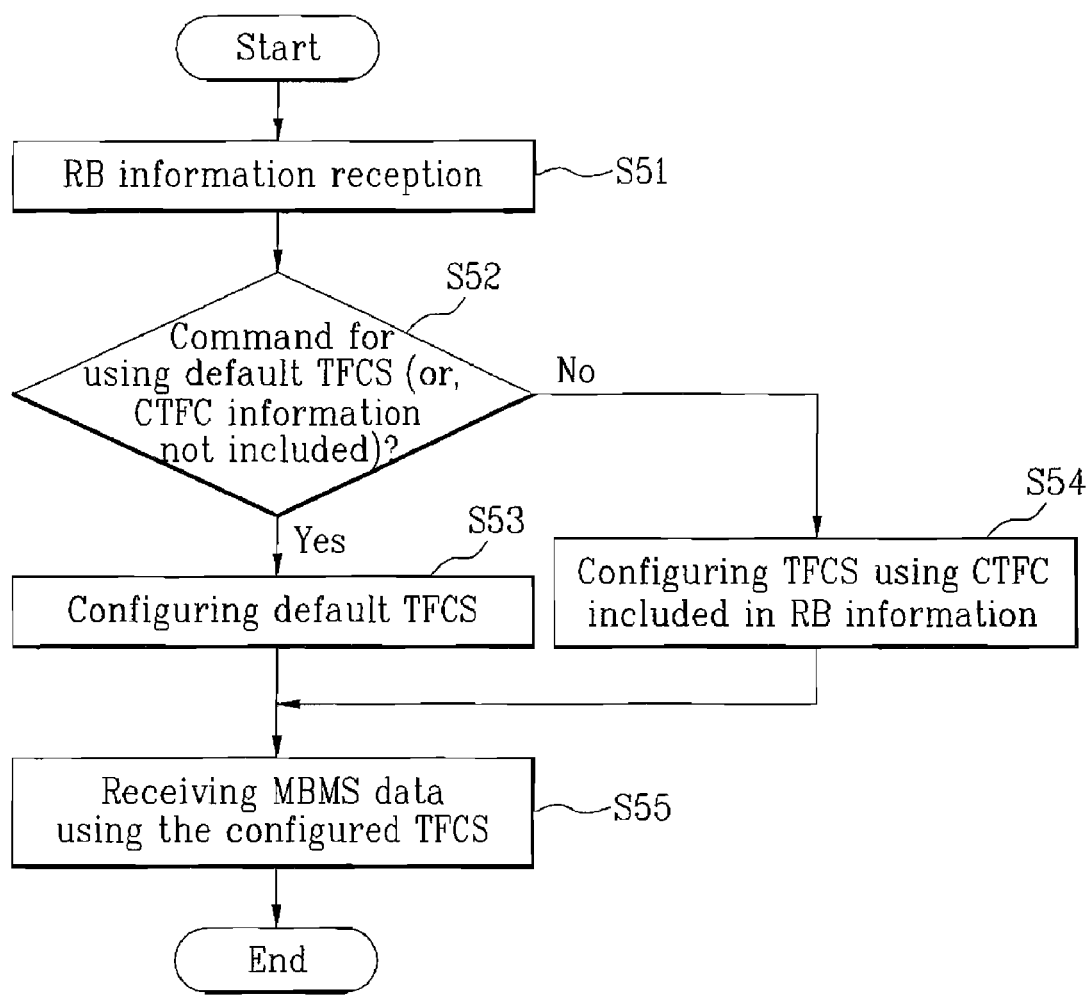
FIG. 5 is a flowchart of a process of receiving MBMS data in UE according to one embodiment of the present invention.

FIG. 5 is a flowchart representing a process of receiving MBMS data in UE according to an embodiment of the present invention. Referring to FIG. 5, a UE receives MBMS control information via an MCCH for receiving MBMS data (S51). The UE checks whether CTFC information exists in the control information or whether a command for using a default TFCS exists in the control information (S52). As a result of the checking step, if the CTFC information does not exist in the control information or if the command for using the default TFCS exists in the control information, the UE configures a default TFCS using the number of transport channels mapped to a physical channel and TFS information for each of transport channels, according to the received MBMS control information (S53). Subsequently, the UE receives MBMS data using the configured TFCS (S55).

If the CTFC information exists in the MBMS control information, the UE configures TFCS using the CTFC information (S54) provided from Node B, and then receives data using the configured TFCS (S55). The MBMS control information includes a point-to-multipoint radio bearer information message of a serving or neighbor cell.

Figure 6:
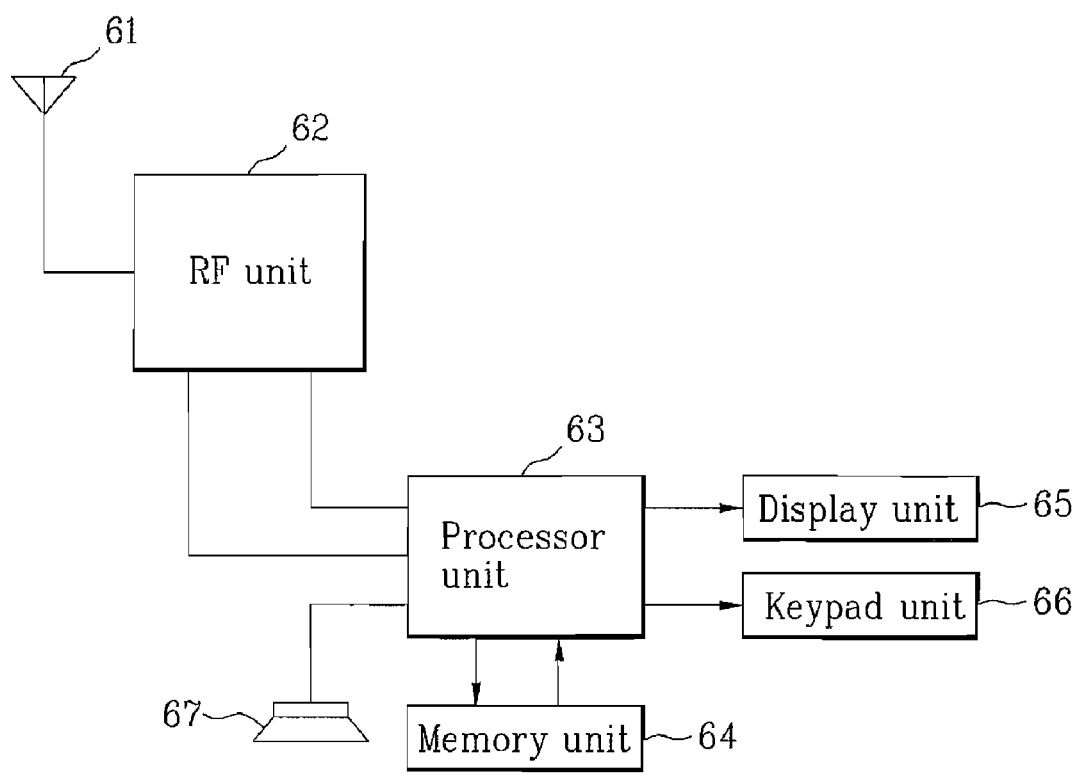
FIG. 6 is a block diagram of a radio communication apparatus according to one embodiment of the present invention.

FIG. 6 is a block diagram of a radio communication apparatus, also described above as a UE, according to one embodiment of the present invention. Referring to FIG. 6, a radio communication apparatus according to the present invention includes an antenna 61, an RF (radio frequency) unit 62, a processor unit 63 and a memory unit 64. The radio communication apparatus according to the present invention further includes a display unit 65 displaying specific information on a screen, a keypad unit 66 receiving a signal from a user, and a speaker unit 67 outputting a sound signal.

A signal received via the antenna and RF units 61 and 62 includes at least one data block multiplexed to one physical channel, size information of the data block, index information corresponding to a data block size combination in a table of data block size combination information, and control information for a data block transmission. The processor unit 63 checks whether a table having combination information of data block sizes needs to be internally configured using the receiving control information. If the table needs to be internally configured, the processor unit 63 configures the table having the combination information of the data block sizes. And, the processor unit 65 decodes the received at least one data block using the data block size combination information corresponding to the index.

The above-described embodiments of the present invention are explained based on a cellular mobile communication network. However, the technical features of the present invention are not limited to the cellular mobile communication network and are applicable to a wireless communication system such as a PDA (personal digital assistant), a notebook computer equipped with a wireless communication function and the like. And, terms used in describing the present invention are not limited to a range of the wireless communication system such as UMTS. And, the present invention is applicable to wireless communication systems using different wireless interfaces and physical layers such as TDMA, CDMA, FDMA and the like.

Moreover, the technical features of the present invention can be implemented with software, firmware, hardware or one of combinations of the software, firmware and/or hardware. Namely, the contents of the present invention are implemented with hardware using a code, circuit chip and a hardware logic such as ASIC or with a code in a storage medium readable by a computer such as a hard disc, a floppy disc, a tape and the like or in a optical storage, ROM or RAM using a computer programming language.

Accordingly, the present invention internally configures the CTFC information without receiving separate CTFC information, thereby facilitating the reception of data blocks.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving information through N higher level channels mapped to one lower level channel at a user equipment in a wireless communication system, the method comprising:
    defining a default transport format combination set (TFCS) for the N higher level channels mapped to the one lower level channel for use in the user equipment for a specific service, wherein the default TFCS is defined by a manner predetermined by the user equipment and a network to include only a first type transport format combination (TFC) used when no higher level channel among the N higher level channels is mapped to the one lower level channel and a second type TFC used when only one higher level channel of the N higher level channels is mapped to the one lower level channel; and
    receiving the one lower level channel with a transport format combination indicator (TFCI) defined by the same manner between the user equipment and the network based on the default TFCS without receiving calculated transport format combination (CTFC) information from the network,
    wherein N is equal to or greater than 1.

2. The method of claim 1, wherein the second type TFC comprises an $i^{th}$ group of TFCS (i=1, 2, ..., N) used when only an $i^{th}$ higher level channel among the N higher level channels is mapped to the one lower layer channel.

3. The method of claim 2, wherein:
    at least one transport format (TF) applicable to the $i^{th}$ higher level channel includes TF0, TF1, TF2, ..., TFmax; and
    TF0 indicates the $i^{th}$ higher level channel is not mapped to the one lower level channel.

4. The method of claim 3, wherein:
    the default TFCS for the N higher level channels has a format of $(TF_1, TF_2, ..., TF_i, ... TF_N)$; and
    $TF_i$ corresponds to a transport format for the $i^{th}$ higher level channel among the N higher level channels.

5. The method of claim 4, wherein the first type TFC comprises (TF0, TF0, ..., TF0, ... TF0).

6. The method of claim 4, wherein the $i^{th}$ group of TFCS (i=1, 2, ..., N) comprises (TF0, TF0, ..., TF1, ... TF0), (TF0, TF0, ..., TF2, ... TF0), ..., and (TF0, TF0, ..., TFmax, ... TF0).

7. The method of claim 1, wherein the specific service comprises a multimedia broadcast/multicast service (MBMS).

8. The method of claim 1, wherein the N higher level channels comprise N transport channels.

9. The method of claim 1, wherein the lower level channel comprises a physical channel.

10. A user equipment for receiving information through N higher level channels mapped to one lower level channel in a wireless communication system, the user equipment comprising:
- an antenna for receiving the one lower level channel with a transport format combination indicator (TFCI);
- a radio frequency unit connected to the antenna and configured to process the one lower level channel; and
- a processor unit operationally connected to the radio frequency unit, the processor configured to:
  - define a default transport format combination set (TFCS) for the N higher level channels mapped to the one lower level channel for use in the user equipment for a specific service by a manner predetermined by the user equipment and the network to include only a first type transport format combination (TFC) used when no higher level channel among the N higher level channels is mapped to the one lower level channel and a second type TFC used when only one higher level channel of the N higher level channels is mapped to the one lower level channel, and
  - process the received one lower level channel using the received TFCI defined by the same manner between the user equipment and the network based on the default TFCS without receiving calculated transport format combination (CTFC) information from the network,
- wherein N is equal to or greater than 1.

11. The user equipment of claim 10, wherein the second type TFC comprises an $i^{th}$ group of TFCS (i=1, 2, ..., N) used when only an $i^{th}$ higher level channel among the N higher level channels is mapped to the one lower layer channel.

12. The user equipment of claim 11, wherein:
- at least one transport format (TF) applicable to the $i^{th}$ higher level channel includes TF0, TF1, TF2, ..., TFmax; and
- TF0 indicates the $i^{th}$ higher level channel is not mapped to the one lower level channel.

13. The user equipment of claim 12, wherein:
- the default TFCS for the N higher level channels has a format of $(TF_1, TF_2, \ldots, TF_i, \ldots TF_N)$; and
- $TF_i$ corresponds to a transport format for the $i^{th}$ higher level channel among the N higher level channels.

14. The user equipment of claim 13, wherein the first type TFC comprises (TF0, TF0, TF0, ... TF0).

15. The user equipment of claim 13, wherein the $i^{th}$ group of TFCS (i=1, 2, ..., N) comprises (TF0, TF0, ..., TF1, ... TF0), (TF0, TF0, ..., TF2, ... TF0), ..., and (TF0, TF0, ..., TFmax, ... TF0).

16. The user equipment of claim 10, wherein the specific service comprises a multimedia broadcast/multicast service (MBMS).

17. The user equipment of claim 10, wherein the N higher level channels comprise N transport channels.

18. The user equipment of claim 10, wherein the lower level channel comprises a physical channel.

* * * * *